(12) United States Patent
Bougon

(10) Patent No.: US 11,591,113 B2
(45) Date of Patent: Feb. 28, 2023

(54) SYSTEM AND METHOD FOR DOCKING AN AEROSTAT, AND AEROSTAT AND RECEIVING STRUCTURES EQUIPPED FOR SUCH A PURPOSE

(71) Applicant: FLYING WHALES, Suresnes (FR)

(72) Inventor: Sébastien Bougon, Paris (FR)

(73) Assignee: FLYING WHALES, Suresnes (FR)

( * ) Notice: Subject to any disclaimer, the term of this patent is extended or adjusted under 35 U.S.C. 154(b) by 803 days.

(21) Appl. No.: 16/465,055

(22) PCT Filed: Nov. 27, 2017

(86) PCT No.: PCT/EP2017/080555
§ 371 (c)(1),
(2) Date: May 29, 2019

(87) PCT Pub. No.: WO2018/099870
PCT Pub. Date: Jun. 7, 2018

(65) Prior Publication Data
US 2019/0283901 A1    Sep. 19, 2019

(30) Foreign Application Priority Data

Dec. 1, 2016 (FR) ...................................... 1661810

(51) Int. Cl.
*B64F 1/14*      (2006.01)
*B64B 1/66*      (2006.01)
(Continued)

(52) U.S. Cl.
CPC .................. *B64F 1/14* (2013.01); *B64B 1/66* (2013.01); *B64C 39/024* (2013.01);
(Continued)

(58) Field of Classification Search
CPC ..... B64F 1/14; B64F 3/00; B64D 5/00; B64B 1/50; B64B 1/66; B64C 39/02;
(Continued)

(56) References Cited

U.S. PATENT DOCUMENTS 2,150,428 A    3/1939    Crum et al.
3,070,096 A1    12/2011    Wood et al.
(Continued)

FOREIGN PATENT DOCUMENTS

DE    548638 C    4/1932
DE    10121854 C1    11/2002

OTHER PUBLICATIONS

French Search Report from French Patent Application No. 1661810, dated Jul. 27, 2017.
(Continued)

*Primary Examiner* — Richard Green
*Assistant Examiner* — Michael A. Fabula
(74) *Attorney, Agent, or Firm* — Greer, Burns & Crain, Ltd

(57) ABSTRACT

A system for docking an aerostat on a receiving structure, including an unmanned aerial vehicle that can be controlled so as to move between the aerostat and the receiving structure, carrying a first end of a cable that has a second end fixed to the aerostat or the receiving structure, and to attach said first end to the receiving structure or to the aerostat such that the cable connects the aerostat to the receiving structure.

9 Claims, 3 Drawing Sheets

(51) Int. Cl.
*B64C 39/02* (2023.01)
*B66D 1/12* (2006.01)
(52) U.S. Cl.
CPC .... *B64C 2201/027* (2013.01); *B64C 2201/12* (2013.01); *B66D 1/12* (2013.01)
(58) Field of Classification Search
CPC . B64C 39/022; B64C 39/024; B64C 2201/12; B64C 2201/128; B64C 2201/082; B64C 2201/182; B64C 2201/206
See application file for complete search history.

(56) References Cited

U.S. PATENT DOCUMENTS

| | | | |
|---|---|---|---|
| 8,820,681 B2* | 9/2014 | Brutoco | B64B 1/20 244/115 |
| 9,944,366 B2* | 4/2018 | Tang | B63C 9/01 |
| 2010/0102164 A1 | 4/2010 | Brutoco | |
| 2015/0129716 A1* | 5/2015 | Yoffe | B64F 1/0297 244/110 C |
| 2016/0309346 A1 | 10/2016 | Priest | |
| 2016/0340006 A1* | 11/2016 | Tang | B64C 39/024 |

OTHER PUBLICATIONS

International Search Report from International Patent Application No. PCT/EP2017/080555, dated Mar. 6, 2018.

* cited by examiner

SYSTEM AND METHOD FOR DOCKING AN AEROSTAT, AND AEROSTAT AND RECEIVING STRUCTURES EQUIPPED FOR SUCH A PURPOSE

BACKGROUND

The present invention relates to a system for docking an aerostat on a mobile or fixed receiving structure. It also relates to a docking method implemented in this system, as well as an aerostat equipped with this system and a suitable receiving structure.

The field of the invention is more particularly, but non-limitatively, that of dirigible balloons.

Docking large dirigible aerostats on mooring masts has always been a tricky manoeuvre that required the involvement of a large number of persons on the ground, sometimes over one hundred, which proved time-consuming and presented risks both for the crews of these aerostats and for the persons on the ground.

Furthermore, piloting these dirigibles on the approach to receiving structures on the ground is generally complex due to aerodynamic conditions that are sometimes unfavourable on the approach to the ground and to the high intrinsic inertia of these aircraft.

The aim of the present invention is to overcome these drawbacks by proposing a docking system that can facilitate the approach of an aerostat to a receiving structure and allow it to dock more easily and more safely than under the current conditions.

SUMMARY

This objective is achieved with a system for docking an aerostat on a receiving structure, characterized in that it comprises at least one unmanned aerial vehicle that is controllable in order to move between the aerostat and the receiving structure while carrying a first end of a mooring cable, the second end of which is fastened to the aerostat or to the receiving structure and in order to fasten this first end to the receiving structure or to the aerostat, so that this cable connects the aerostat to the receiving structure.

Thus, by creating a mechanical connection by cable between the aerostat and the receiving structure by means of an unmanned aerial vehicle, it becomes much easier to bring the nose of the aerostat closer to the receiving structure, even under disturbed weather conditions.

The docking system according to the invention can also advantageously comprise means for winding the cable connecting the aerostat to the receiving structure, so as to bring the aerostat closer to the receiving structure.

In a particular version of a docking system according to the invention, the winding means comprise a winding device housed within the aerostat.

In another version, the winding means comprise a winding device housed on the receiving structure.

The winding device can advantageously comprise a motorized winch having a substantially vertical axis of rotation, placed at the top of the receiving structure. This motorized winch comprises for example a drum provided with a slot intended to receive the end of the mooring cable.

The docking system according to the invention is preferably arranged in order to release the unmanned aerial vehicle after the first end of the cable has been fastened to the receiving structure or to the aerostat.

In a particular embodiment of a docking system according to the invention, the unmanned aerial vehicle is arranged so that it can be housed within the aerostat, this unmanned aerial vehicle being arranged for being controlled in order to (i) carry to the receiving structure a first end of the mooring cable, the second end of which is fastened to the aerostat and (ii) fasten the first end to the receiving structure.

In another embodiment of a docking system according to the invention, the unmanned aerial vehicle is arranged in order to start from the receiving structure, this unmanned aerial vehicle being arranged for being controlled in order to (i) carry to the aerostat a first end of the mooring cable, the second end of which is fastened to the receiving structure and (ii) fasten the first end to the aerostat.

In a particular version of the invention, the mooring cable comprises a plurality of consecutive sections with successively increasing diameters, a first of these sections having the smallest diameter and being terminated by the first end intended to be carried by the unmanned aerial vehicle.

In another version of the invention, the winding device housed in the receiving structure is coupled to a mechanical connection system comprising a first mechanical connector placed at the nose of the aerostat and a second mechanical connector placed at the top of the receiving structure, these first and second mechanical connectors being intended to be coupled mechanically at the end of a winding sequence of the mooring cable.

According to another aspect of the invention, a method is proposed for docking an aerostat on a receiving structure, implemented in a docking system according to the invention, comprising the steps of:

controlling at least one unmanned aerial vehicle carrying a first end of a mooring cable the second end of which is fastened to the aerostat or to the receiving structure, along a path leading it to the receiving structure or to the aerostat; and fastening the first end of the mooring cable to a pail of the receiving structure or of the aerostat.

The docking method according to the invention can also comprise a step of winding the mooring cable after fastening the first end thereof to the receiving structure or to the aerostat, until a part of the aerostat substantially reaches a part of the receiving structure.

When the method according to the invention is implemented in a docking system according to the invention combined with a mechanical coupling system, the step of winding the mooring cable is carried out until achieving a coupling of the first and second mechanical connectors respectively equipping the aerostat and the receiving structure.

The docking method according to the invention can advantageously comprise a step for releasing the unmanned aerial vehicle while maintaining the fastening of the first end of the cable to the receiving structure.

The successive steps of the docking method according e invention can be at east partially controlled from the aerostat and/or from the ground.

The unmanned aerial vehicle can be programmed so that in autonomous mode it reaches the receiving structure from the aerostat or the aerostat from the receiving structure.

According to yet another aspect of the invention, an aerostat is proposed equipped with a docking system according to the invention, as well as a receiving structure suitable for receiving this docking system.

BRIEF DESCRIPTION OF THE DRAWINGS

Other advantages and features of the invention will become apparent on reading the detailed description of implementations and embodiments that are in no way limitative, and from the following attached drawings.

DETAILED DESCRIPTION

Figure 1:
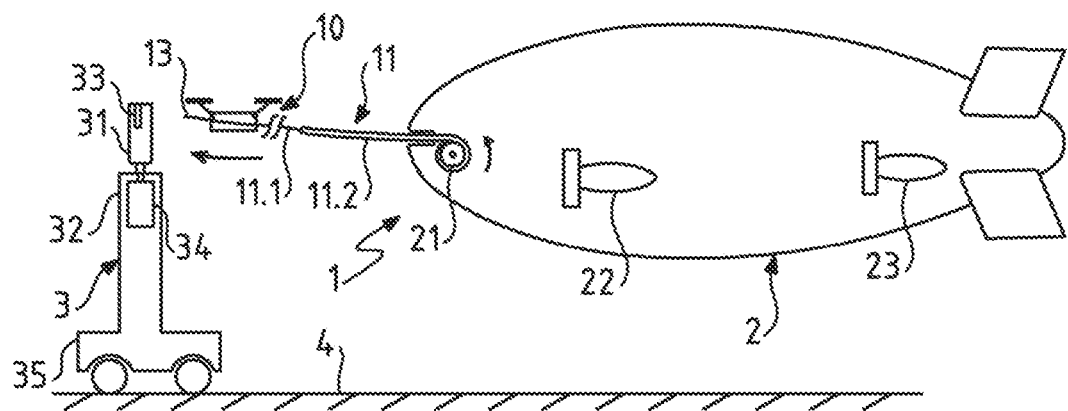
FIG. 1 shows diagrammatically a first example implementation of a docking system according to the invention.

As these embodiments are in no way limitative, variants of the invention can be considered in particular comprising only a selection of the characteristics described or shown hereinafter in isolation from the other characteristics described or shown (even if this selection is isolated within a phrase comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, with reference to FIGS. 1 and 2, a first embodiment of a docking system 1 according to the invention will be described, at the same time as the method implemented in this system.

The docking system 1 comprises an unmanned aerial vehicle 10 controlled in order to carry a mooring cable 11 unwinding from a drum 21 placed at the front of an aerostat 2 equipped with propulsion units 22, 23, towards a receiving structure 3.

This receiving structure 3 comprises a base 35, optionally self-propelled, resting on the ground or on a track 4, and a mast 32, at the top of which a winch is placed, comprising a cable drum 31, the vertical shaft of which is driven by a motor 34. The drum 31 is provided with a slot 33 arranged in order to receive the end 13 of the mooring cable.

The unmanned aerial vehicle 10 is for example of the four-engine type with four propellers 101, 102, 103, 104 and comprises a central device 100 for locking/unlocking a mooring cable.

When the aerostat 2 is on the approach to the receiving structure 3, the pilot triggers a docking procedure with the unmanned aerial vehicle 10 taking off from the aerostat, carrying the end 13 of the mooring cable 11 locked in the central device 100 of the unmanned vehicle 10. The cable drum 21 is controlled in free-wheel mode so as to allow the cable to unwind freely and allow the unmanned vehicle 10 to pull this cable, limiting the traction forces. The unmanned vehicle 10 follows an optimized path in the direction of the drum 31 at the top of the receiving structure 3 and is controlled so as to insert the end 13 into the receiving slot 33 of the drum 31. When this insertion has been carried out, the unmanned vehicle 10 then releases the mooring cable 11.

The drum 31 is then driven by the motor 34 in order to wind the cable 11, the second end of which is henceforth maintained fixed with respect to the aerostat 2, either by immobilization of the drum 21 housed in the aerostat 2, or because the cable 2 is fully unwound from this drum 21. As shown in FIG. 2, the unmanned vehicle 10 can then leave the docking zone and return for example to a recharging site or to the aerostat 2.

The cable drum 31 situated on the receiving structure 3 is driven until the nose of the aerostat 2 is located in immediate proximity to the receiving zone 3. With reference to FIG. 2, the mooring cable 11 can comprise several sections having different diameters, for example a first section 11.1 having a first diameter, a second section 11.2 having a second diameter greater than the first, then a third section 11.3 having a third diameter greater than the second. The first section 11.1 of smaller diameter is the one the end 13 of which is carried by the unmanned vehicle 10, This has the effect of limiting the weight load imposed on the unmanned vehicle 10 in the first part of the path thereof towards the receiving structure 3. A cable could also be designed, distributing the respective lengths of the cable sections so as to ensure that the weight of cable supported by the unmanned vehicle is minimized.

Figure 3:
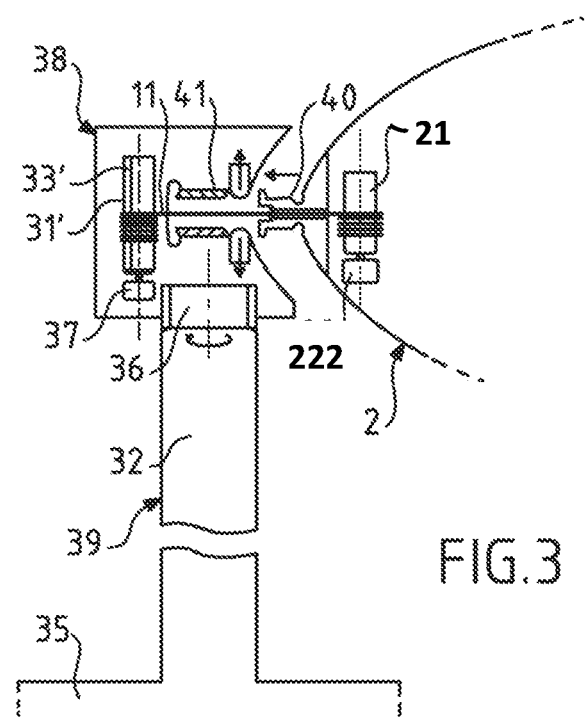
FIG. 3 shows diagrammatically a particular configuration of a docking system according to the invention forming an integral part of a mechanical coupling system of an aerostat to a receiving structure.

The docking system according to the invention can also be combined with a mechanical coupling system of the aerostat to the receiving structure, as shown in FIG. 3. Thus, a receiving structure 39 can be designed that is immobilized on the ground 4 and comprising on the upper part of the mast 32 thereof, an assembly 38 that is mobile in rotation by means of a bearing mechanism 36, This mobile assembly 38 includes a female mechanical connector 41 arranged in order to receive a male mechanical connector 40 firmly fixed to the nose of the aerostat 2, as well as a winding device 31' driven by a motor 37.

When the unmanned vehicle 10, as described with reference to FIGS. 1 and 2, has successfully inserted the end 13 of the mooring cable 11 into the slot 33' of the drum 31', then has released the cable 11 and has moved away from the receiving structure, the drum 31' is then driven so as to wind the cable 11 and thus to pull the aerostat 2 until it is close to the mobile assembly 38 and the male mechanical connector 40 enters the female mechanical connector 41, thus ensuring mechanical coupling of the aerostat 2 to the receiving structure 39.

Now, with reference to FIGS. 4 to 7, another embodiment of a docking system 110 according to the invention will be described, at the same time as the docking method implemented in this system.

Figure 2:
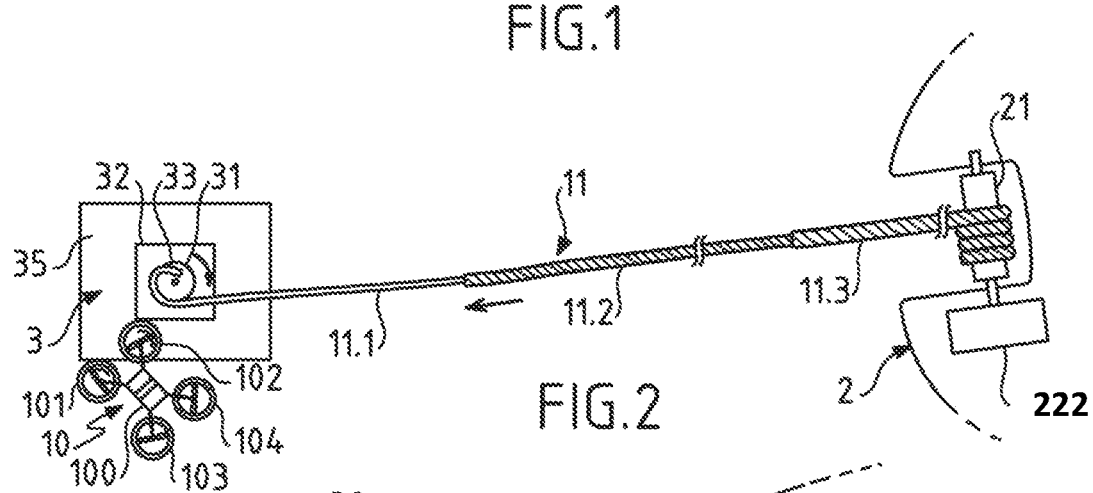
FIG. 2 is a top view of the docking system according to the invention shown in FIG. 1, at a stage where the unmanned aerial vehicle moves away after having made the connection of the cable to the receiving structure.

The docking system 110 is intended to carry out docking of an aerostat 200 to a receiving structure 300 such as a mooring mast, with reference to FIG. 1. This receiving structure 300 comprises an incurved part 130 provided with a hitch device 310, for example a piece in the form of a hook, intended to receive a looped end 120 of a mooring cable 11, and can generally be moved in a plane 4. It can for example be placed on the bed of a lorry or have a drive unit.

The docking system 110 comprises an unmanned aerial vehicle 10, for example of the quadcopter type, carrying a free end forming a loop 120 in the mooring cable 11, the other end of which is wound on a winch drum 210 on board the aerostat 200 and driven by a motor 222. The unmanned vehicle 10 is intended to be housed within the aerostat 200 in a housing 220 which can be closed by a hatch device or equivalent (not shown).

Figure 4:
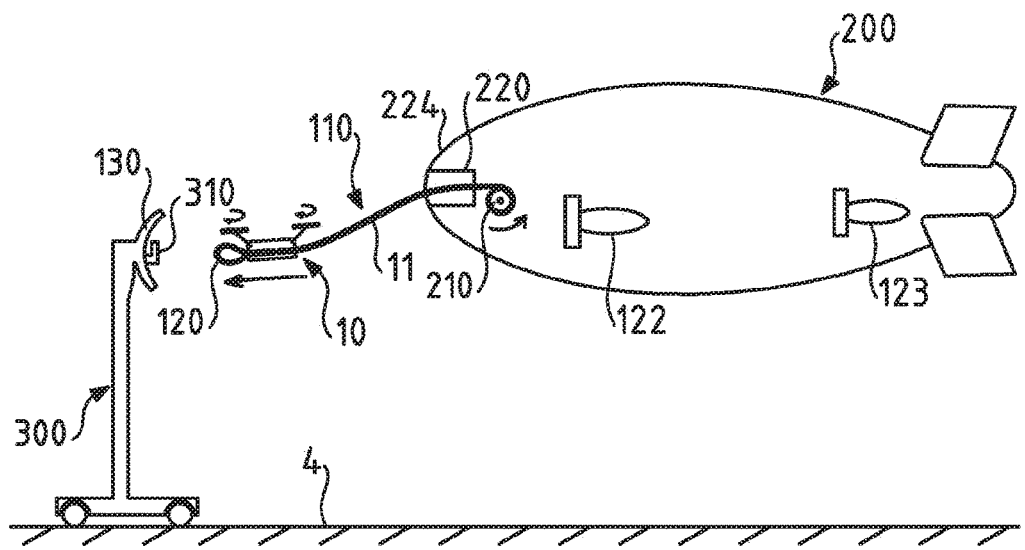
FIG. 4 shows another version of a docking system according to the invention, in which the receiving structure is simply provided with a hitch device.

When the aerostat 200 is on the approach to the receiving structure 300 under the control of vector thrusters 122, 123, only two of which are shown in FIG. 4, which are placed on either side of the main body of the aerostat 200, the pilot station of this aerostat controls the flight of the unmanned aerial vehicle 10 which then leaves the housing 220 thereof and carries the first end 120 of the mooring cable 11. The path of this unmanned aerial vehicle 10 is controlled towards the target constituted by the hitch device 310 arranged on the upper part of the receiving structure 300. Provision can also be made for the unmanned aerial vehicle 10 to operate in autonomous mode in order to travel between the aerostat 200 and the hitch device 310 of the receiving structure 300.

Figure 5:
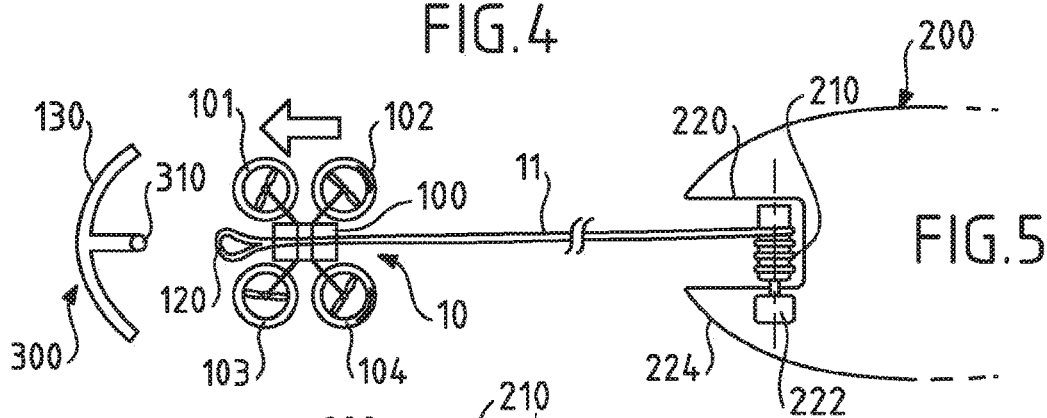
FIG. 5 shows the approach of an unmanned aerial vehicle carrying a mooring cable towards a receiving structure of the docking system shown in FIG. 4.
Figure 6:
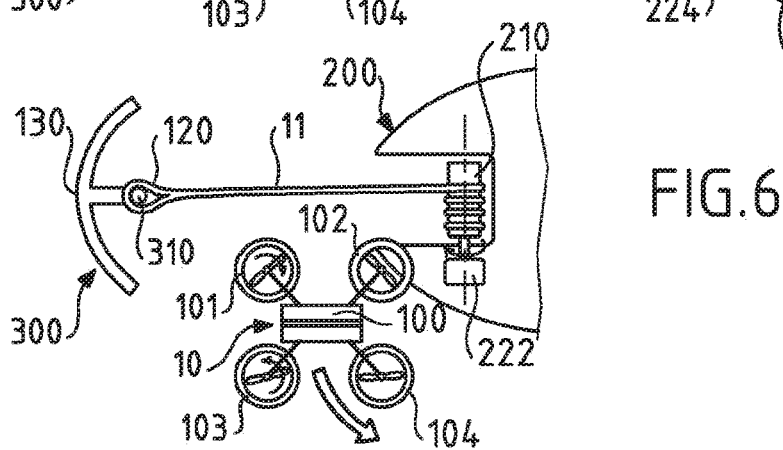
FIG. 6 shows diagrammatically the connection of a mooring cable to the receiving structure and the unmanned aerial vehicle moving away, in the configuration of the docking system shown in FIG. 4.

The unmanned aerial vehicle 10 shown in FIGS. 5 and 6 comprises four rotors 101-104 and a controlled locking device 100 of the end 120 of the mooring cable 11. When the unmanned aerial vehicle 10 is controlled on the approach path thereof, the winch 210 is placed in free-wheel position so that the cable can unwind without resistance so as not to brake the movement of the unmanned vehicle 10.

Figure 7:
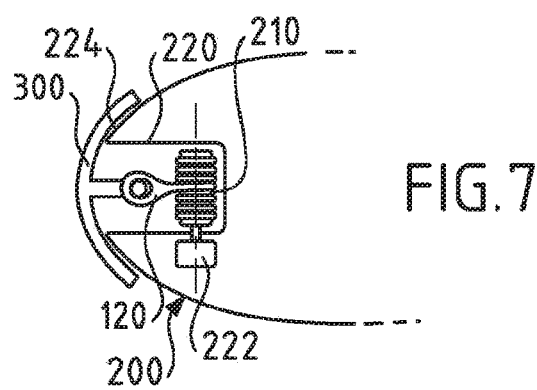
FIG. 7 is a top view showing the mechanical connection of the nose of an aerostat according to the invention to a receiving structure, in the configuration of the docking system shown in FIG. 4.

When the unmanned vehicle 10 has reached the target thereof, it is then controlled in order to insert the loop performing the function of end 120 into the hitch device 310. When the insertion operation has been carried out, the unmanned aerial vehicle 10 is then commanded in order to unlock the device 100 and thus release the mooring cable 11. The unmanned aerial vehicle 10 can then leave the docking zone, as shown in FIG. 6, and return either to the dedicated housing 220 in order to be recharged electrically therein, or to a reception zone on the ground dedicated to this unmanned vehicle. The drive motor 222 of the winch drum 210 is then controlled in order to wind the cable 11 so as to bring the aerostat 200 closer to the receiving structure 300 until the nose 224 of the aerostat 200 is substantially in contact with the incurved part 130 of the receiving structure 300, as shown in FIG. 7.

Figure 8:
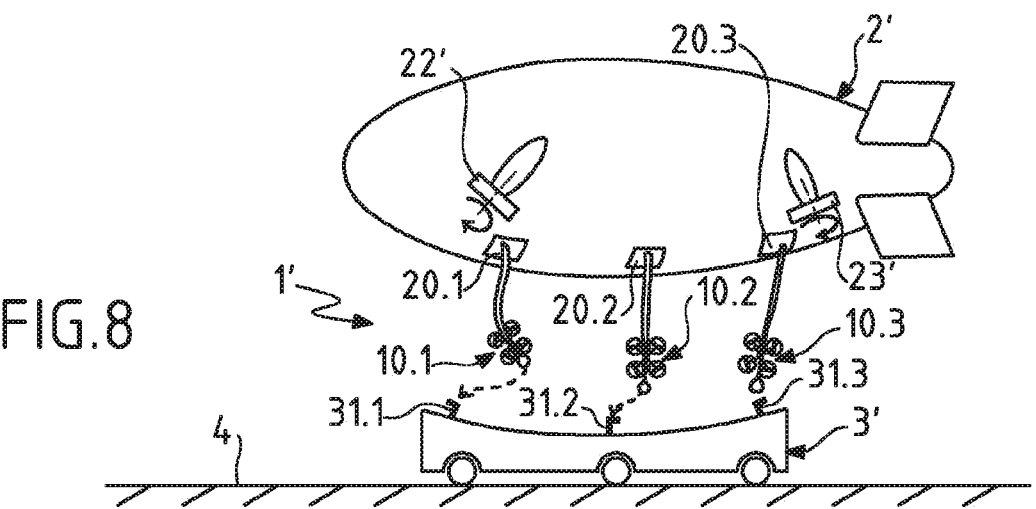
FIG. 8 shows diagrammatically a docking system according to the invention implementing a plurality of unmanned aerial vehicles.

With reference to FIG. 8, the receiving structure 3', intended to receive an aerostat 2', can have a configuration of the cradle type on a motorized frame capable of moving and being immobilized on the ground 4. The aerostat 2', provided with vector thrusters 22', 23', is equipped with a docking system 1' comprising several unmanned aerial vehicles 10.1, 10.2, 10.3, intended to be placed in housings 20.1, 20.2, 20.3 and in order to reach hitch devices 31.1, 31.2, 31.3 positioned on an upper part of the receiving structure 3'.

Figure 9:
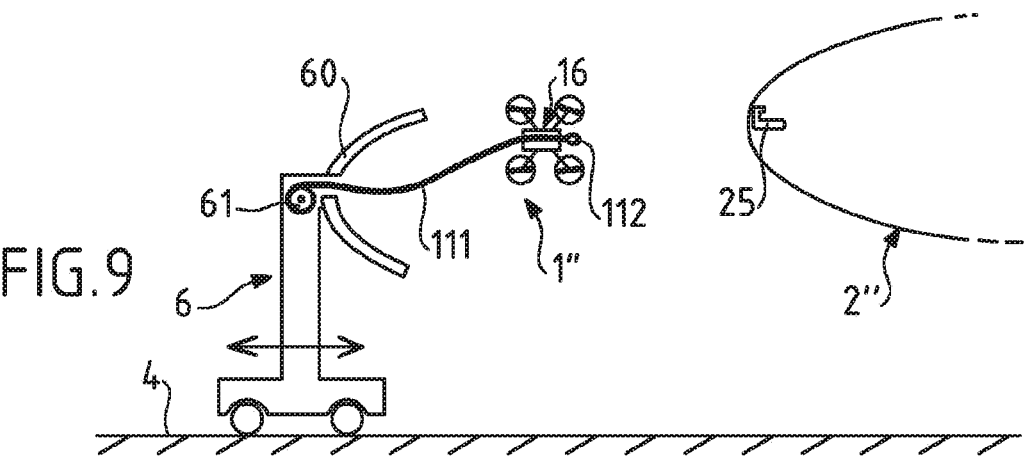
FIG. 9 shows diagrammatically another embodiment of a docking system according to the invention, in which the unmanned aerial vehicle is housed within the receiving structure and the nose of the aerostat is provided with a hitch device.
Figure 10:
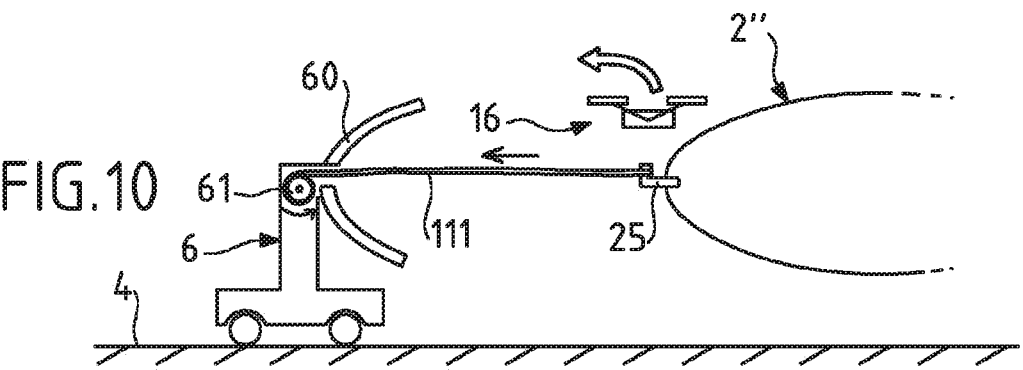
FIG. 10 shows a step of fastening the mooring cable to the aerostat and the departure of the unmanned aerial vehicle, in the configuration of the docking system shown in FIG. 9.
Figure 11:
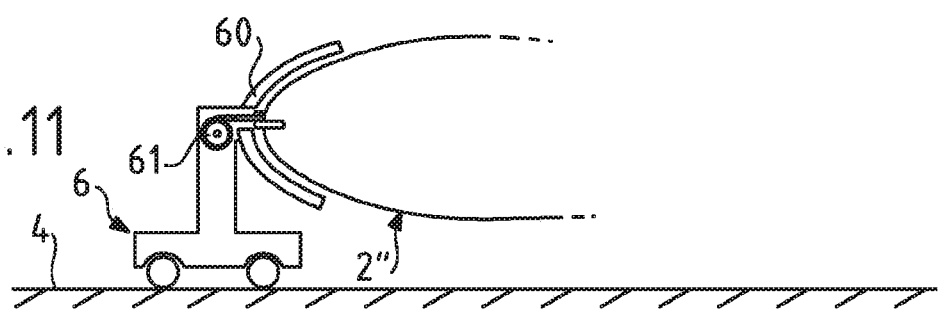
FIG. 11 shows the mechanical connection of the aerostat to the receiving structure, carried out by means of a docking system as shown in FIGS. 9 and 10.

With reference to FIGS. 9 to 11, provision can also be made for another configuration in which the docking system 1" comprises at least one unmanned aerial vehicle 16 attached to a motorized receiving structure 6 placed on the ground or a track 4 and arranged in order to carry a mooring cable 111 to an aerostat 2" on approach to the receiving structure 6 provided with an incurved device 60 intended to receive the nose of the aerostat 2". This receiving structure can be provided with a housing (not shown) for receiving the unmanned aerial vehicle 16 and a motorized winch 61 controlling the unwinding or the winding of the mooring cable 110.

When the unmanned aerial vehicle 16 has reached the nose of the aerostat 2" which is provided with a hitch device 25 shown diagrammatically in FIG. 9 and when the motorized winch 61 is controlled in order to allow the cable 111 to unwind, it is then controlled in order to insert the end loop 112 of the mooring cable 111 into the hitch device 25, then in order to unlock the cable 111 and leave the docking zone, as shown in FIG. 10. The unmanned aerial vehicle 16 can then return to the base thereof within or on the receiving structure 6 or can be controlled in order to return to a dedicated reception zone in order to be electrically recharged therein.

After the mooring cable 111 has been fastened to the hitch device 25 of the aerostat 2", the motorized winch 61 is then controlled in order to wind the cable 111 and thus to move the aerostat 2" closer to the receiving structure 6 which is maintained immobilized with respect to the ground 4 or optionally can move under control in order to facilitate the coupling of the aerostat 2" to the receiving structure. Control of winding of the cable 111 is stopped when the nose of the aerostat 2" enters substantially into contact with the incurved receiving device 60, as shown in FIG. 11.

It is well understood that all or part of the docking systems described above with reference to the aforementioned figures can be combined together.

Of course, the various features, forms, variants and embodiments of the invention can be combined together in various combinations to the extent that they are not incompatible or mutually exclusive. In particular, all the variants and embodiments described above can be combined together.

The invention claimed is:

1. A method for docking an aerostat on a receiving structure, the method comprising the steps of:
controlling an unmanned aerial vehicle carrying a first end of a mooring cable, wherein a second end of the mooring cable is fastened to said aerostat or to said receiving structure, along a path leading the unmanned aerial vehicle to said receiving structure or said aerostat; and
fastening said first end of said mooring cable to a part of said receiving structure or of said aerostat;
winding the mooring cable using a winding device after fastening the first end thereof to the receiving structure or to the aerostat until a part of said aerostat substantially reaches a part of said receiving structure,
wherein the winding device is housed in the receiving structure and is coupled to a mechanical connection system comprising a first mechanical connector placed at a nose of the aerostat and a second mechanical connector placed at a top of the receiving structure, said first and second mechanical connectors being coupled mechanically at an end of a winding sequence of the mooring cable, wherein the step of winding the mooring cable is carried out until coupling of the first and second mechanical connectors is achieved.

2. The docking method according to claim 1, further comprising a step for releasing the unmanned aerial vehicle while maintaining the fastening of the first end of the cable to the receiving structure.

3. The docking method according to claim 1, wherein the controlling, winding and fastening steps are at least partially controlled from the aerostat.

4. The docking method according to claim 1, wherein the controlling, winding and fastening steps are at least partially controlled from the ground.

5. The docking method according to claim 1, wherein the unmanned aerial vehicle is programmed to reach the receiving structure, autonomously from the aerostat, or the aerostat from the receiving structure.

6. A method for docking an aerostat on a receiving structure, the method comprising the steps of:
controlling an unmanned aerial vehicle carrying a first end of a mooring cable, wherein a second end of the mooring cable is fastened to said aerostat or to said receiving structure, along a path leading the unmanned aerial vehicle to said receiving structure or said aerostat; and
fastening said first end of said mooring cable to a part of said receiving structure or of said aerostat; and
releasing the unmanned aerial vehicle while maintaining the fastening of the first end of the cable to the receiving structure.

7. The docking method according to claim 6, wherein controlling, fastening and releasing steps are at least partially controlled from the aerostat.

8. The docking method according to claim 6, wherein the controlling, fastening and releasing steps are at least partially controlled from the ground.

9. The docking method according to claim 6, wherein the unmanned aerial vehicle is programmed to reach the receiving structure, autonomously from the aerostat, or the aerostat from the receiving structure.

\* \* \* \* \*